United States Patent
Stanley et al.

(10) Patent No.: US 9,788,180 B2
(45) Date of Patent: *Oct. 10, 2017

(54) MEDIA ECHOING AND SOCIAL NETWORKING DEVICE AND METHOD

(71) Applicants: Michael Stanley, Frisco, TX (US); Jeffrey David, Irvine, CA (US)

(72) Inventors: Michael Stanley, Frisco, TX (US); Jeffrey David, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,265

(22) Filed: Nov. 18, 2016

(65) Prior Publication Data

US 2017/0070872 A1 Mar. 9, 2017

Related U.S. Application Data

(63) Continuation of application No. 13/454,546, filed on Apr. 24, 2012, now Pat. No. 9,501,760.

(51) Int. Cl.
| | |
|---|---|
| *G06F 15/16* | (2006.01) |
| *H04W 4/20* | (2009.01) |
| *G06Q 10/10* | (2012.01) |
| *G06Q 50/00* | (2012.01) |
| *H04W 4/02* | (2009.01) |

(52) U.S. Cl.
CPC ............ *H04W 4/206* (2013.01); *G06Q 10/10* (2013.01); *G06Q 50/01* (2013.01); *H04W 4/023* (2013.01)

(58) Field of Classification Search
CPC ............... G06Q 50/01; G06Q 30/0269; H04N 21/25891; H04N 21/4126; H04N 21/6582; H04N 21/44204; H04N 21/4788; H04L 51/32
See application file for complete search history.

(56) References Cited

U.S. PATENT DOCUMENTS

| | | | | |
|---|---|---|---|---|
| 7,693,535 | B2 * | 4/2010 | Dunko | A61B 18/20 455/412.1 |
| 2013/0260896 | A1 * | 10/2013 | Miura | A63F 13/12 463/42 |

* cited by examiner

*Primary Examiner* — John MacIlwinen

(57) ABSTRACT

A method and apparatus for echoing media via a mobile device are disclosed herein. According to an embodiment, the method can include displaying automatically to a user, on the mobile device, a list of one or more respective identifiers of one or more other users experiencing respective media within a selectable geographic area. The user is then allowed to select whether to play one or more of the respective media on the mobile device, and can connect with the one or more other users via a social networking site. As a result, the user can network with previously unknown people, based on a common taste in music or other media, for example, as well as a geographic location.

18 Claims, 4 Drawing Sheets

MEDIA ECHOING AND SOCIAL NETWORKING DEVICE AND METHOD

CROSS REFERENCE TO RELATED APPLICATIONS

This application claims the priority of, and is a continuation of, U.S. patent application Ser. No. 13/454,546 (U.S. Pub. 2013/0282809), filed Apr. 24, 2012, the contents of which are incorporated herein by reference in their entirety.

FIELD OF THE INVENTION

This relates generally to media echoing and social networking methods and devices, for use with mobile systems.

BACKGROUND OF THE INVENTION

Existing media providers, such as Pandora®, Google Play and Spotify, Ltd., allow listeners to wirelessly stream music on mobile devices. In the case of Spotify, Ltd., for example, a user can choose to display his or her music selections on social networking websites, such as Facebook®, and can instantly share music with his or her Facebook "friends" who also subscribe to the media provider.

However, the existing media providers fail to support a mechanism for allowing a user to share, or echo, music, or otherwise connect to other users, who are not currently "friends" via social networking. That is, the existing technology lacks the ability to allow users to establish social interactions with strangers within a predetermined, selectable geographic area, based on a shared interest in chosen media.

Therefore, there exists a need for methods and systems capable of allowing a user to designate a geographic area within which a list of identifiers of other users playing media can be displayed on a user's device, such that the user can select to play (e.g., stream), the same media as one or more of the listed other users. Accordingly, the user can network with previously unknown people, based on a common taste in music, for example.

SUMMARY OF THE INVENTION

The presently disclosed embodiments are directed to solving one or more of the problems presented in the prior art, described above, as well as providing additional features that will become readily apparent by reference to the following detailed description when taken in conjunction with the accompanying drawings.

One embodiment is directed to a method of echoing media via a mobile device. The method can include displaying automatically to a user, on the mobile device, a list of one or more respective identifiers of one or more other users experiencing respective media within a selectable geographic area; and allowing the user to select whether to play one or more of the respective media on the mobile device.

Another embodiment is directed to an apparatus for echoing media. The apparatus includes a display configured to display automatically to a user, on a mobile device, a list of one or more respective identifiers of one or more other users experiencing respective media within a geographic area defined by the user; and a section unit configured to allow the user to select whether to play one or more of the respective media on the mobile device.

Yet another embodiment is directed to a system configured to echo media on a mobile device. The system includes a positioning unit configured to determine respective distances of a plurality of mobile device, with respect to a first mobile device; a processor configured to compare the distances between each of the plurality of mobile devices and the first mobile device to a preselected distance selected by a first user of the first mobile device; and transmitter configured to transmit, to the first mobile device, a list of one or more other of the plurality of mobile devices, automatically when any one of the one or more other of the plurality of mobile devices moves within the preselected distance form the first mobile device used by the first user. According to certain embodiments, the list includes personalized and reconfigurable identifiers, respectively, of each user of the one or more other of the plurality of mobile devices that moves within the preselected distance, and the list includes respective media currently being streamed from a centralized server by each user of the one or more other of the plurality of mobile devices that moves within the preselected distance. The system further includes a display unit configured to display automatically, to the first user, the list such that the first user selects whether to stream one or more of the respective media from the centralized server; and a transmitter configured to transmit an indication to the centralized server indicating that the first user has selected to stream one or more of the respective media. According to certain embodiments, the centralized server is further configured to indicate to at least one of the one or more other of the plurality of mobile devices that the first user has se3lected to stream one or more of the respective media. The indication from the centralized server can include a personalized identifier designated by the first user.

It is to be understood that both the foregoing general description and the following detailed description are exemplary and are intended to provide further explanation of the claimed subject matter.

BRIEF DESCRIPTION OF THE DRAWINGS

The present disclosure, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF THE PREFERRED EMBODIMENTS

In the following description of embodiments, reference is made to the accompanying drawings which form a part hereof, and in which it is shown by way of illustration specific embodiments in which the invention can be practiced. It is to be understood that other embodiments can be used and structural changes can be made without departing from the scope of the disclosed embodiments.

Figure 1:
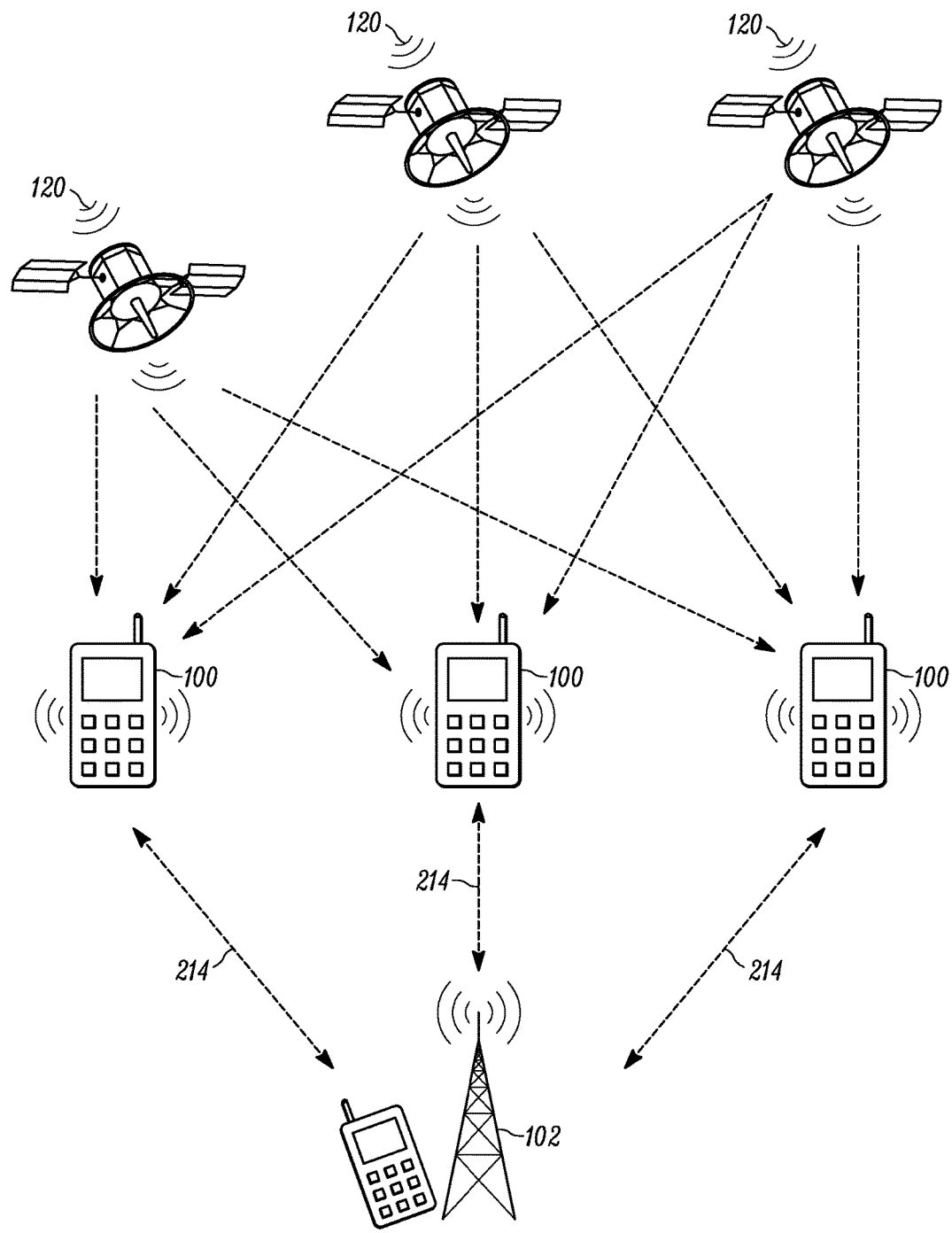
FIG. 1 illustrates an exemplary operating environment including wireless mobile devices, according to various embodiments of the present disclosure.

FIG. 1 illustrates a mobile radio channel operating environment, according to one embodiment of the present invention. The mobile radio channel operating environment may include a base station (BS) 102, one or more mobile stations (also referred to as MS, mobile device, or the like) 100, and global positioning system (GPS) satellites 120. As described in further detail below, the respective locations of the mobile devices 100 can be determined based on GPS satellites 120 or other known mechanisms and systems for detecting relative proximities of mobile devices 100, performed by hardware and software within mobile devices 100 themselves.

The exemplary mobile station 100 in FIG. 1 is a mobile phone; however, alternately, mobile station 100 may be an automobile, MP3 player or other similar portable device. According to some embodiments, mobile station 100 may be a personal wireless computer such as a wireless notebook computer, a wireless palmtop computer, tablet, or other mobile computer devices.

The base station 102 can be a centralized server unit having a memory module, processor module and transceiver module, configured to store and distribute media to mobile stations 100. According to an embodiment, base station 102 can be another mobile device 100, as would be understood by one of ordinary skill in the art. Mobile stations 100 can include any conventional GPS receiver modules, which are not depicted.

Figure 2:
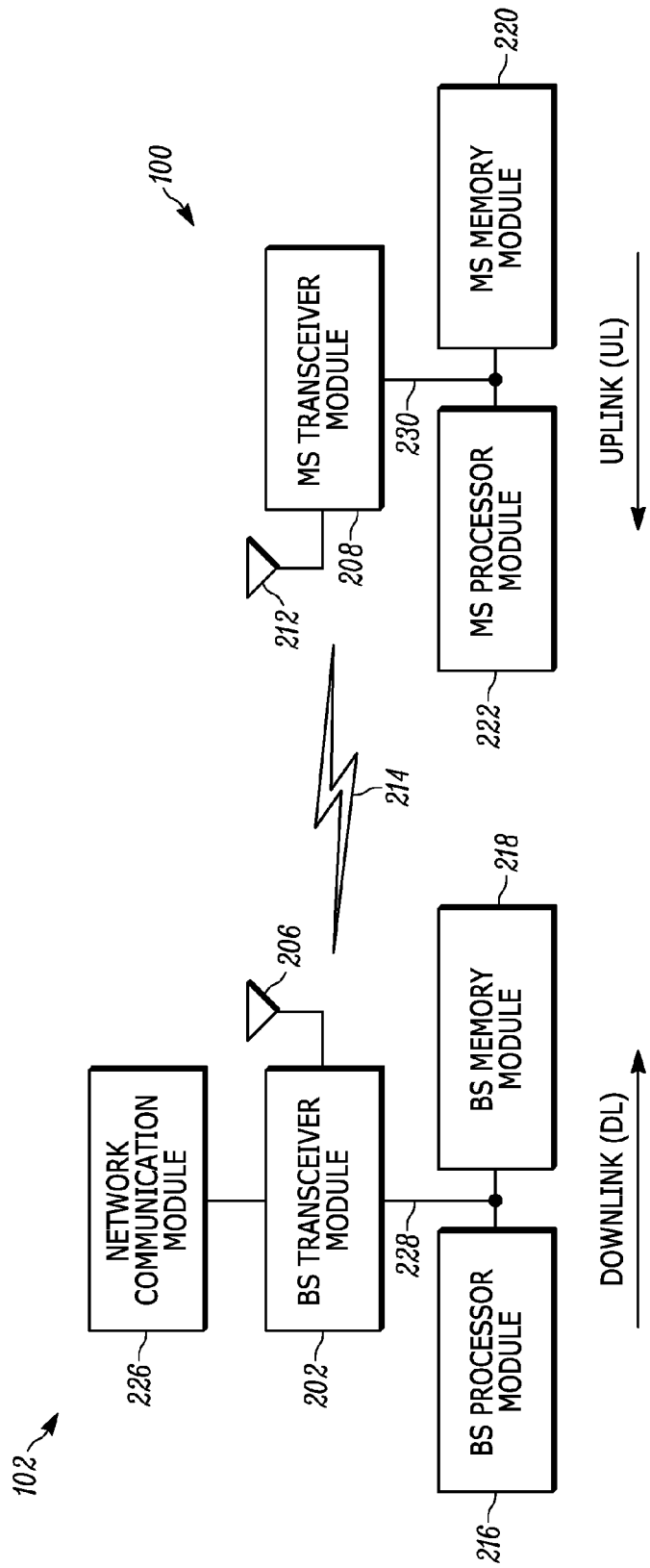
FIG. 2 illustrates an exemplary communication system including a mobile device and a base station, according to various embodiments of the present disclosure.

FIG. 2 shows an exemplary wireless communication system for transmitting and receiving data between mobile station 100 and base station 102, in accordance with one embodiment of the present invention. The mechanism may include components and elements configured to support known or conventional operating features that need not be described in detail herein. This system generally comprises a base station 102 with a base station transceiver module 202, a base station antenna 206, a base station processor module 216 and a base station memory module 218. System 200 generally comprises a mobile station 100 with a mobile station transceiver module 208, a mobile station antenna 212, a mobile station memory module 220, a mobile station processor module 222, and a network communication module 226. Of course both BS 102 and MS 100 may include additional or alternative modules without departing from the scope of the present disclosure.

Furthermore, these and other elements of the system may be interconnected together using a data communication bus (e.g., 228, 230), or any suitable interconnection arrangement. Such interconnection facilitates communication between the various elements of the wireless system. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In the exemplary system, the base station transceiver 202 and the mobile station transceiver 208 each comprise a transmitter module and a receiver module (not shown). Additionally, although not shown in this figure, those skilled in the art will recognize that a transmitter may transmit to more than one receiver, and that multiple transmitters may transmit to the same receiver.

The mobile station transceiver 208 and the base station transceiver 202 are configured to communicate via a wireless data communication link 214. The mobile station transceiver 208 and the base station transceiver 202 cooperate with a suitably configured RF antenna arrangement 206/212 that can support a particular wireless communication protocol and modulation scheme. In the exemplary embodiment, the mobile station transceiver 208 and the base station transceiver 202 can be configured to support industry standards such as the Third or Fourth Generation Partnership Project Long Term Evolution (3GPP or 4GPP LTE), Time Division-Synchronous Code Division Multiple Access (TD-SCDMA), Wi-Fi, and the like. The mobile station transceiver 208 and the base station transceiver 202 may be configured to support alternate, or additional, wireless data communication protocols, including future variations of IEEE 802.16, such as 802.16e, 802.16m, and so on.

Processor modules 216/222 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practical embodiments the processing logic may be resident in the base station and/or may be part of a network architecture that communicates with the base station transceiver 202.

The steps of a method or algorithm described in connection with the embodiments disclosed herein may be embodied directly in hardware, in firmware, in a software module executed by processor modules 216/222, or in any practical combination thereof. A software module may reside in memory modules 218/220, which may be realized as RAM memory, flash memory, ROM memory, EPROM memory, EEPROM memory, registers, a hard disk, a removable disk, a CD-ROM, or any other form of storage medium known in the art. In this regard, memory modules 218/220 may be coupled to the processor modules 218/222 respectively such that the processors modules 216/220 can read information from, and write information to, memory modules 618/620. As an example, processor module 216, and memory modules 218, processor module 222, and memory module 220 may reside in their respective ASICs. The memory modules 218/220 may also be integrated into the processor modules 216/220. In an embodiment, the memory module 218/220 may include a cache memory for storing temporary variables or other intermediate information during execution of instructions to be executed by processor modules 216/222.

Memory modules 218/220 may also include non-volatile memory for storing instructions to be executed by the processor modules 216/220.

Memory modules 218/220 may include a frame structure database (not shown) in accordance with an exemplary embodiment of the invention. Frame structure parameter databases may be configured to store, maintain, and provide data as needed to support the functionality of system 200 in the manner described below. Moreover, a frame structure database may be a local database coupled to the processors 216/222, or may be a remote database, for example, a central network database, and the like. A frame structure database may be configured to maintain, without limitation, frame structure parameters as explained below. In this manner, a frame structure database may include a lookup table for purposes of storing frame structure parameters.

The network communication module 226 generally represents the hardware, software, firmware, processing logic, and/or other components of the system that enable bi-directional communication between base station transceiver 202, and network components to which the base station transceiver 202 is connected. For example, network communication module 226 may be configured to support interne or Wi-Fi traffic. In a typical deployment, without limitation, network communication module 226 provides an 802.3 Ethernet interface such that base station transceiver 202 can communicate with a conventional Ethernet based computer network. In this manner, the network communication module 226 may include a physical interface for connection to the computer network (e.g., Mobile Switching Center (MSC)).

Figure 3:
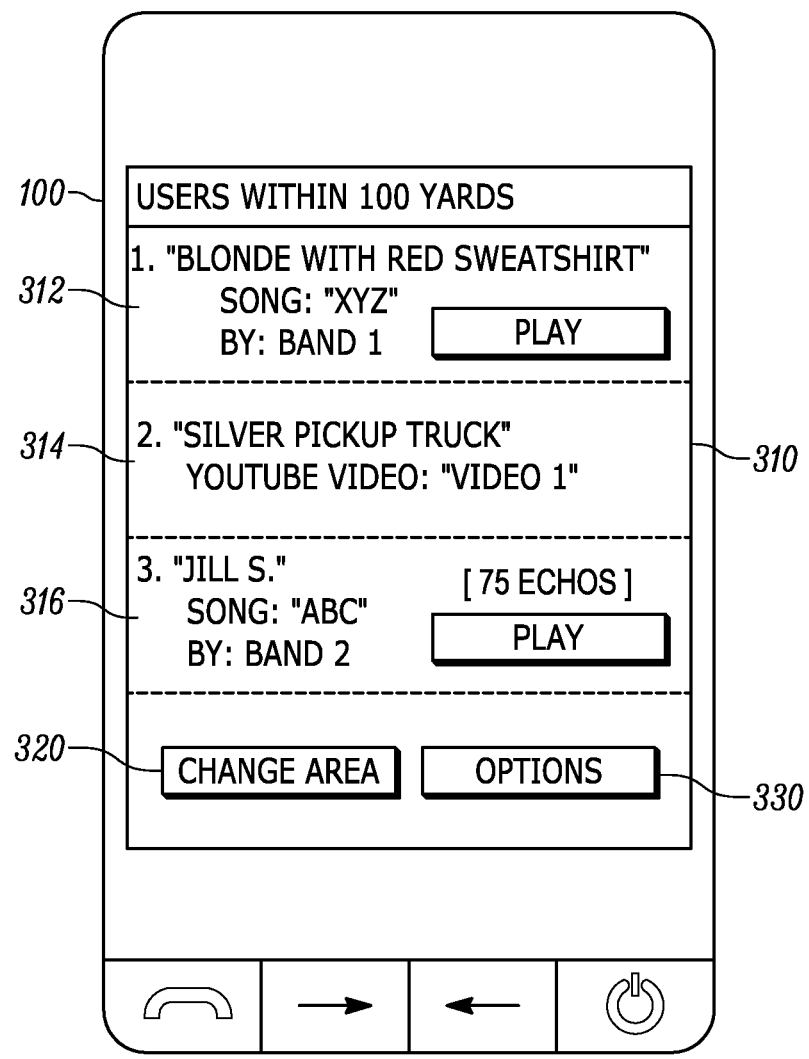
FIG. 3 illustrates an exemplary mobile device displaying various features of the present technology, according to various embodiments of the present disclosure.

FIG. 3 shows an exemplary mobile device 100, according to an embodiment of the present disclosure. For exemplary purposes, the mobile device 100 is depicted as a wireless telephone; however, any mobile device may be incorporated without departing from the scope of the invention. For example, according to an embodiment, the mobile device 100 can be an on-board computing system within an automobile. As shown in FIG. 3, a list is displayed in display area 310, which includes identifiers of three other mobile device 100 users who are currently playing media and are within a preselected geographic area selected by the user of the depicted mobile device 100.

According to certain embodiments, GPS satellites 120 can provide an exact position to each mobile device 100, which in turn transmit their respective positions to a centralized server (e.g., base station 102). The centralized server can also store the preselected geographic area determined by the user (e.g., a radius of 100 yards), and can compare the distances between the depicted mobile device 100 and other mobile devices 100 who are playing media and are logged on to a particular web site or application, for example. If any of the other mobile devices 100 are logged on and within the user's defined area, then the centralized server can automatically incorporate the identifiers of the users of those other mobile devices 100 into the list displayed in display area 310 of the depicted mobile device 100. The user of the depicted mobile device 100 can change the desired geographic area within which to locate other users, via the "CHANGE AREA" icon 320, which can allow the user to customize the searchable area.

In this exemplary scenario, three other mobile devices have been determined to be within the bounds set by the user of the depicted mobile device 100 (e.g., "Blond with Red Sweatshirt," 312 "Silver Pickup Truck," 314 and "Jill S." 316). The identifiers are respectively designated by each of the users of the mobile devices 100. Of course, one of ordinary skill in the art would realize that the users could change their respective identifiers at any time (e.g., via their own "OPTIONS" icon 330), depending on what car they are driving, where they are located, what they are wearing, their appearance, a nickname, or any other identifying features they wish to show up on the other users' lists.

According to one embodiment, the list can include an identifier of what type of media is being experienced by the respective other users (e.g., "Jill S." 316 is listening to song "ABC" by Band 2). Alternatively, the other users may be watching video via YouTube, for example, like "Silver Pickup Truck" 314. The user of the depicted mobile device 100 can select to play (or echo) any of the media that is being experienced by the other users on the list.

According to the depicted example, the user can select a "PLAY" icon, which will transmit a signal to the centralized server to request streaming of the identified media. The streaming can begin from the start of the particular song or video, for example, or can begin at a middle point in the song or video where the identified other user is currently at in real time.

In the depicted example, the number of times other users who are identified on the list have been "echoed" (i.e., the number of times other users have decided to experience the same media that they are currently experiencing) can be provided to the user of the depicted mobile device 100. In this case, "Jill S." 316 is identified as having 75 echoes.

Of course, the layout of the features and information presented on the list is merely one example, and is not intended to limit the scope of the disclosure in any way. One of ordinary skill in the art would realize that various additional information and combinations thereof could be depicted in various ways. Moreover, a touchscreen cellular phone is depicted with icons that can execute various functions via the user's touch. However, any display device could be implemented with any type of scroll, highlight and/or selection mechanisms in conventional mobile devices.

Furthermore, it is not necessary for GPS satellites to be utilized in obtaining exact coordinates of each mobile device 100. Using known techniques of detecting the presence of other mobile devices within a defined radius, each mobile device 100 could determine on its own that another mobile device 100 is within an acceptable range. That is, it would not be necessary for the centralized server to make the comparison between the respective distances and the desired area preselected by the user of the mobile device 100. Within certain distances, mobile devices 100 could identify themselves are concurrently running an echoing application or logged on to a particular website, and could transfer identifiers and media information automatically via any conventional technique, such as Blutetooth®, etc. Then, if the user of the mobile device 100 depicted in FIG. 3 decided to select one or more media on the list to play, a signal would be transmitted to the centralized server requesting to stream the particular media.

Figure 4:
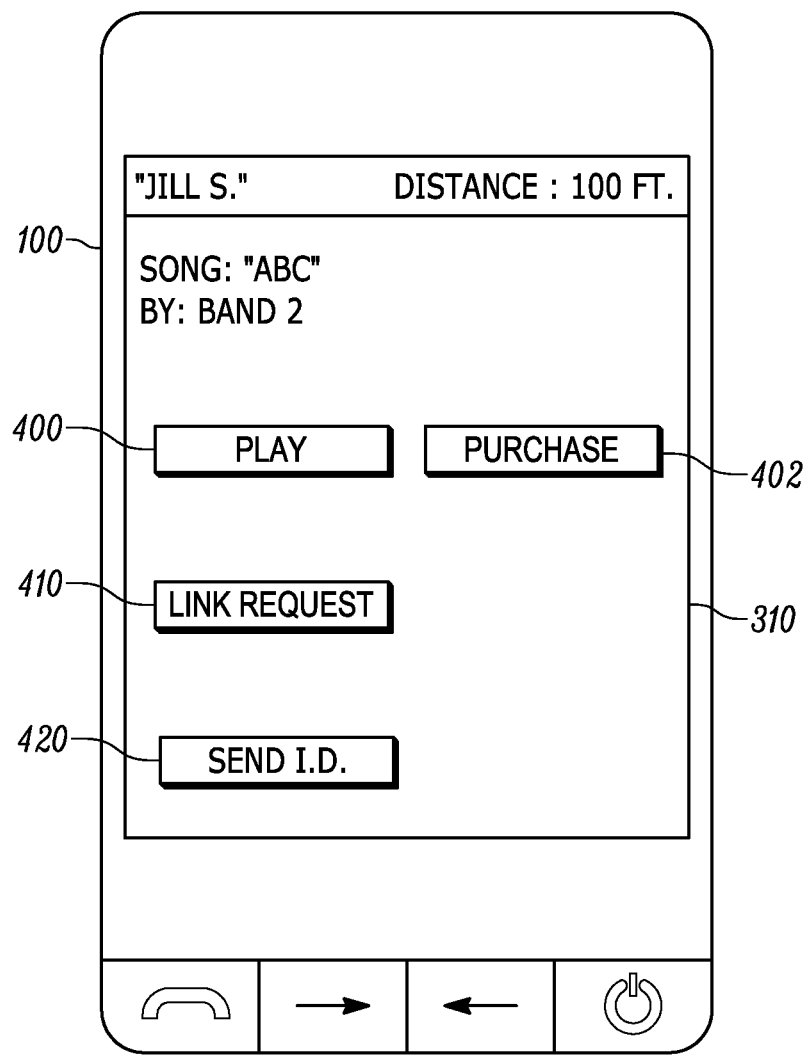
FIG. 4 illustrates an exemplary mobile device displaying various features of the present technology, according to various embodiments of the present disclosure.

FIG. 4 is an exemplary mobile device 100, according to an embodiment of the present disclosure. In the depicted embodiment, display area 310 shows a layout of the screen if the user decides to select identifier "Jill S." 316 for additional options, but does not immediately decide to echo the media by selecting "PLAY." In FIG. 4, display area 310 shows the precise distance that between "Jill S." and the depicted mobile device 100 (e.g., 100 ft.). The exemplary display area provides an option for the user to play the media (i.e., "PLAY" 400) or purchase the song, for example (i.e., "PURCHASE" 402). If the user selects to purchase the media, the mobile device 100 can automatically direct the user to a media distributer, such as iTunes, Amazon, etc.

According to the exemplary embodiment, the user of the depicted mobile device 100 can select "LINK REQUEST" 410, which can send a signal to the centralized server, instructing the centralized server to send a friend request, for example, for connecting via social networking (e.g., a friend request via Facebook for Google+, or any other social networking outlet). Of course, it is possible that the request can be sent directly to the user of the other device (i.e., "Jill S.") directly, if contact information is exchanged beforehand, using any conventional technique.

According to the exemplary embodiment, the user of the depicted mobile device 100 can select "SEND I.D." 420, which can send a signal to the centralized server, instructing the centralized server to send an identification message to the mobile device of one or more of the other users, which was echoed by the depicted mobile device 100. Of course, the user of the depicted mobile device 100 can designate and personalize any identifier of his or her choosing to be displayed to the user of the echoed device. In this manner, the user of the echoed device can become aware that another user has echoed the media being played on his or her device, and can receive an identifier of the user who has echoed the media.

In accordance with the present disclosure, a user may be allowed to designate a geographic area within which a list of identifiers of other users playing media can be displayed on a user's device, such that the user can select to play (e.g., stream), the same media as one or more of the listed other users (a.k.a. echo). Therefore, as one exemplary advantage to embodiments described herein, the user can network with previously unknown people, based on a common taste in music or other media, for example, as well as a geographic location.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:
1. A method, comprising:
   displaying automatically to a user, on a mobile device, one or more respective identifiers of one or more other users experiencing respective media within a selectable geographic area;
   displaying automatically to the user a number corresponding, respectively, to each of the one or more other users, wherein the number is alterable at least in part when one experiences respective media in real time while each of the one or more other users currently experiences the respective media, wherein
the number is displayed concurrently with the one or more respective identifiers of the one or more other users determined to be within the predetermined geographic area, along with an indication that the one or more other users are within the predetermined geographic area;
allowing the user to select whether to experience one or more of the respective media on the mobile device; and
causing a centralized server to transmit a signal to the second user to display to the second user a changeable identifier of the user of the mobile device after the user of the mobile device selects to experience the media being experienced by the second user, wherein
when the user selects to experience one or more of the respective media on the mobile device, the respective media is streamed such that the respective media is synchronized in real time with the respective media experienced by the second user.

2. The method of claim 1, wherein the geographic area is determined based on a selectable distance between the mobile device and one or more other devices, determined using a positioning mechanism.

3. The method of claim 1, further comprising:
providing an option to request a connection with one or more of the one or more other users via a social networking website.

4. The method of claim 2, wherein the respective identifiers are listed in order of the respective determined distances.

5. The method of claim 1, wherein the respective identifiers are listed in order of their respective number.

6. The method of claim 1, wherein the respective media initiated by the second user is previously stored on a server before being initiated.

7. A mobile device configured to echo media, comprising:
a display configured to display automatically to a user, on the mobile device, one or more respective identifiers of one or more other users experiencing respective media within a selectable geographic area, wherein
the display is further configured to display a number corresponding, respectively, to each of the one or more other users, wherein the number is alterable at least in part when one experiences respective media in real time while each of the one or more other users currently experiences the respective media, and
the number is displayed concurrently with the one or more respective identifiers of the one or more other users determined to be within the predetermined geographic area, along with an indication that the one or more other users are within the predetermined geographic area;
the display is further configured to display a selection icon configured to allow the user to select whether to experience one or more of the respective media on the mobile device; and
a transmitter configured to transmit a signal to a centralized server causing the centralized server to transmit a signal to the second user to display to the second user a changeable identifier of the user of the mobile device after the user of the mobile device selects to experience the media being experienced by the second user, wherein
when the user selects to experience one or more of the respective media on the mobile device, the respective media is streamed such that the respective media is synchronized in real-time with the respective media experienced by the second user.

8. The mobile device of claim 7, wherein the geographic area is determined based on a selectable distance between the mobile device and one or more other devices, determined using a positioning mechanism.

9. The mobile device of claim 7, wherein
the display is further configured to display an icon configured to provide an option to request a connection with one or more of the one or more other users via a social networking website.

10. The mobile device of claim 8, wherein the respective identifiers are listed in order of the respective determined distances.

11. The mobile device of claim 7, wherein the respective identifiers are listed in order of their respective number.

12. The mobile device of claim 7, wherein the respective media initiated by the second user is previously stored on a server before being initiated.

13. A non-transitory computer readable medium, storing instructions thereon for, when executed by a processor, causing a device to perform functions, comprising:
displaying automatically to a user, on the device, one or more respective identifiers of one or more other users experiencing respective media within a selectable geographic area;
displaying automatically to the user a number corresponding, respectively, to each of the one or more other users, wherein the number is alterable at least in part when one experiences respective media in real time while each of the one or more other users currently experiences the respective media, wherein
the number is displayed concurrently with the one or more respective identifiers of the one or more other users determined to be within the predetermined geographic area, along with an indication that the one or more other users are within the predetermined geographic area;
allowing the user to select whether to experience one or more of the respective media on the device; and
causing a centralized server to transmit a signal to the second user to display to the second user a changeable identifier of the user of the device after the user of the device selects to experience the media being experienced by the second user, wherein
when the user selects to experience one or more of the respective media on the device, the respective media is streamed such that the respective media is synchronized in real time with the respective media experienced by the second user.

14. The computer-readable medium of claim 13, wherein the geographic area is determined based on a selectable distance between the device and one or more other devices, determined using a positioning mechanism.

15. The computer-readable medium of claim 13, the functions further comprising:
providing an option to request a connection with one or more of the one or more other users via a social networking website.

16. The computer-readable medium of claim 14, wherein the respective identifiers are listed in order of the respective determined distances.

17. The computer-readable medium of claim 13, wherein the respective identifiers are listed in order of their respective number.

18. The computer-readable medium of claim 13, wherein the respective media initiated by the second user is previously stored on a server before being initiated.

\* \* \* \* \*

UNITED STATES PATENT AND TRADEMARK OFFICE
CERTIFICATE OF CORRECTION

PATENT NO. : 9,788,180 B2  
APPLICATION NO. : 15/355265  
DATED : October 10, 2017  
INVENTOR(S) : Stanley et al.

Page 1 of 1

It is certified that error appears in the above-identified patent and that said Letters Patent is hereby corrected as shown below:

In the Claims

In Column 9, Line 5, delete "predetermined" and insert --selectable-- therefor.

In Column 9, Line 7, delete "predetermined" and insert --selectable-- therefor.

In Column 9, Line 51, delete "predetermined" and insert --selectable-- therefor.

In Column 9, Line 53, delete "predetermined" and insert --selectable-- therefor.

In Column 10, Line 37, delete "predetermined" and insert --selectable-- therefor.

In Column 10, Line 40, delete "predetermined" and insert --selectable-- therefor.

Signed and Sealed this  
Second Day of June, 2020

Andrei Iancu  
*Director of the United States Patent and Trademark Office*